Nov. 1, 1932.  F. G. WALKER  1,886,321
ATTACHMENT FOR BAND SAWS
Filed April 25, 1932  2 Sheets-Sheet 1
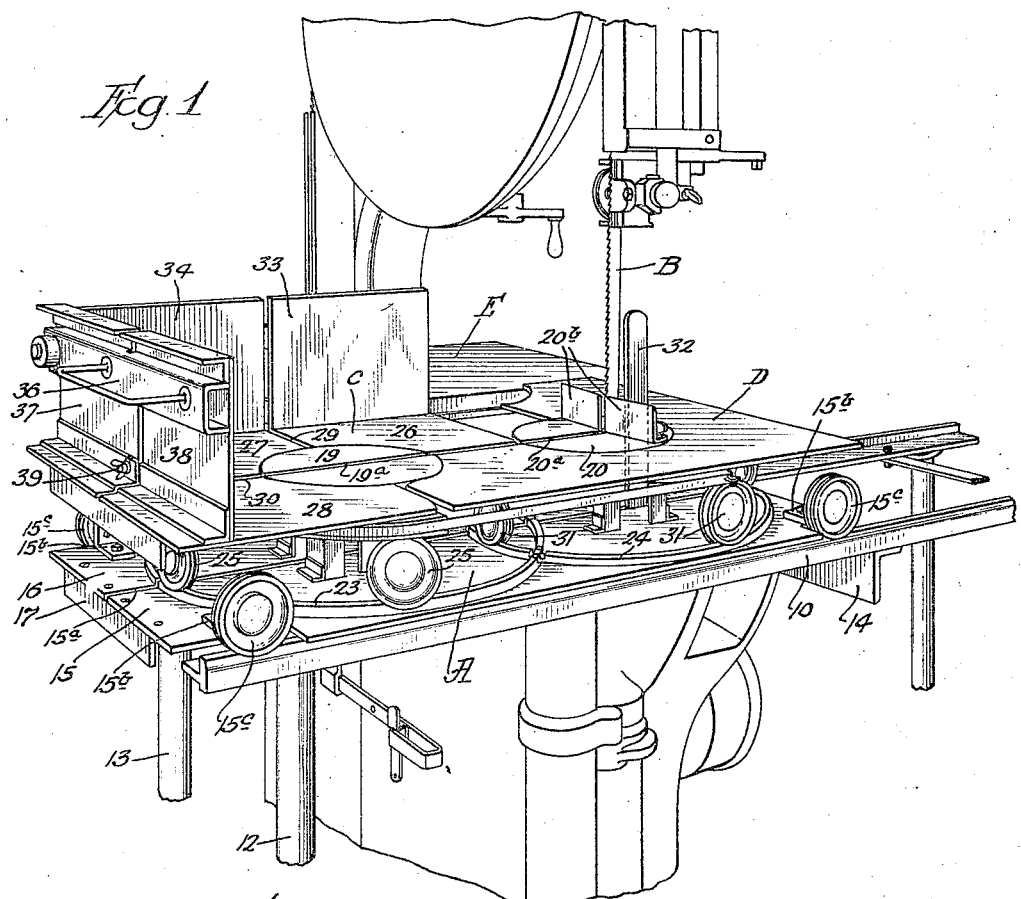
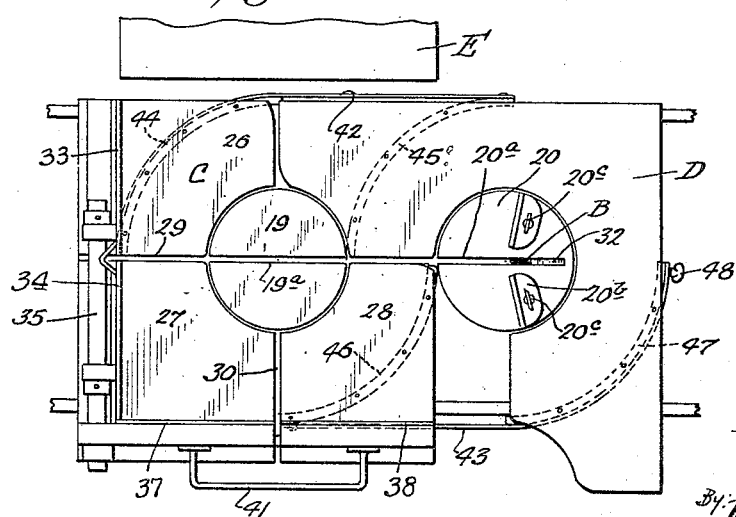
Inventor:
Fred G. Walker
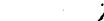
Attys.

Nov. 1, 1932.  F. G. WALKER  1,886,321
ATTACHMENT FOR BAND SAWS
Filed April 25, 1932    2 Sheets-Sheet 2
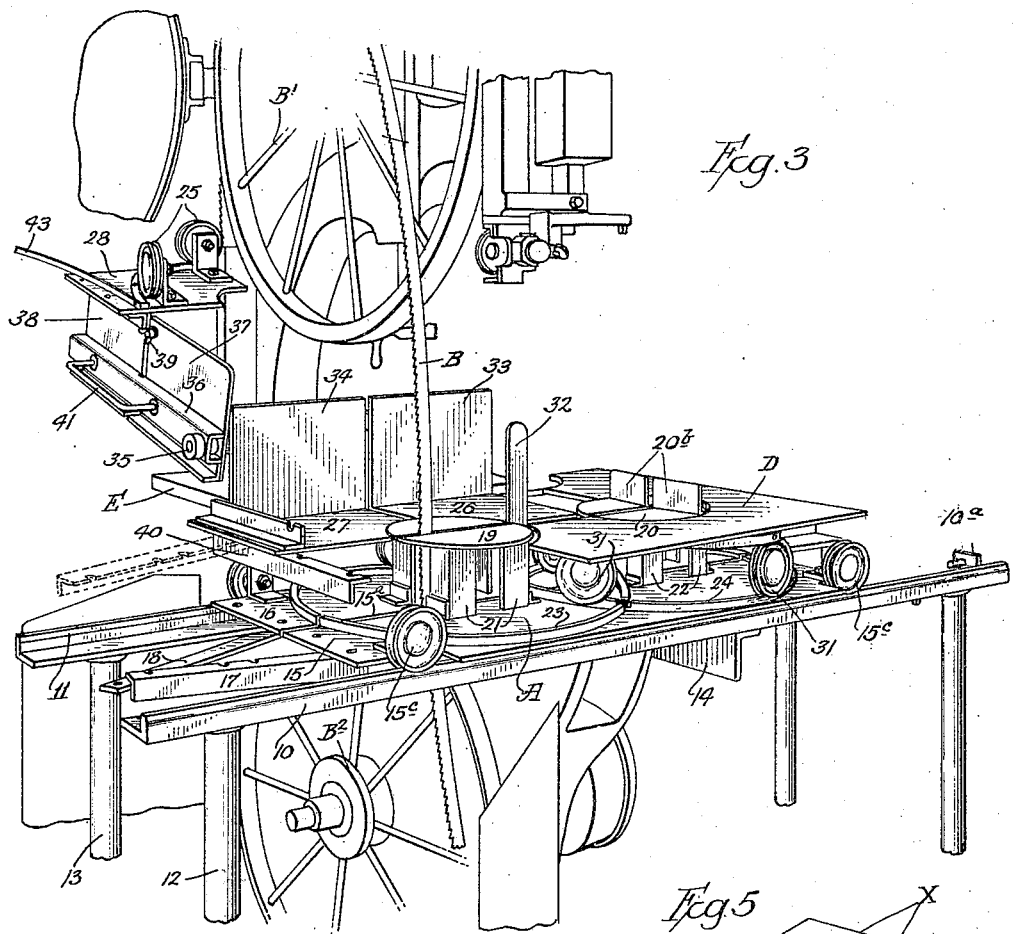
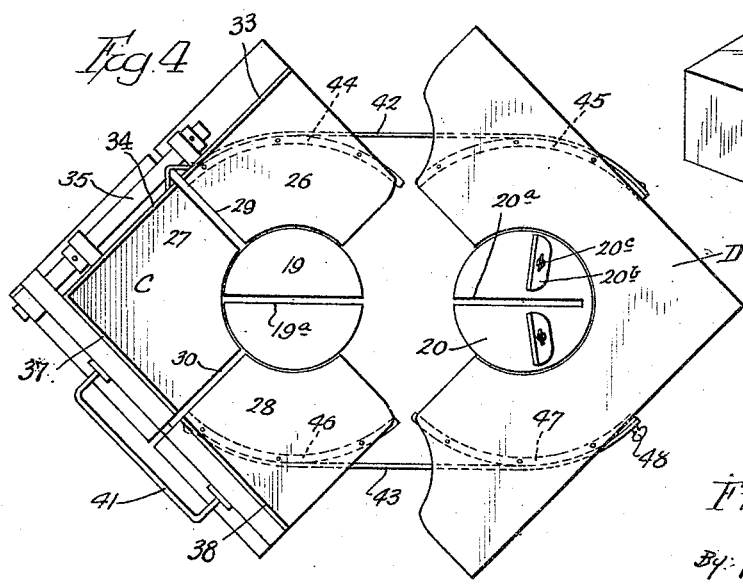
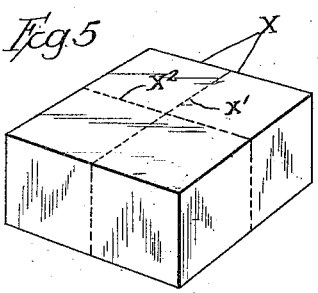
Inventor:
Fred G. Walker Patented Nov. 1, 1932

1,886,321

UNITED STATES PATENT OFFICE

FRED G. WALKER, OF CHICAGO, ILLINOIS, ASSIGNOR TO JONES SUPERIOR MACHINE CO., OF CHICAGO, ILLINOIS, A CORPORATION OF ILLINOIS

ATTACHMENT FOR BAND SAWS

Application filed April 25, 1932. Serial No. 607,232.

An object of this invention is to provide a simple and efficient means for sawing blocks, such as blocks of solid carbon dioxide, into smaller blocks by apparatus which will make cuts at right angles to each other through the original block, thereby quartering it, without removing it from the apparatus.

Another object is to provide such apparatus as an attachment for a well known type of band saw. Still another object is to provide apparatus of this type in which the band saw can readily be removed for repair or replacement without the removal of the attachment as a whole.

These and other objects, as will hereinafter appear, are accomplished by this invention which is fully described in the following specification and shown in the accompanying drawings, in which—

Figure 1 is a partial perspective view of a band saw with the attachment applied thereto;

Fig. 2 is a plan view of the attachment showing the same turned through an angle of 90° from the position of Fig. 1;

Fig. 3 is a view similar to Fig. 1 but with the attachment corresponding to the position of Fig. 2;

Fig. 4 is a view similar to Fig. 2 showing the attachment in process of being shifted from one operative position to the other; and Fig. 5 is a perspective view of a block having indicated thereon in dotted lines the cuts which it is desired should be made.

The invention consists primarily of an attachment for use in connection with a band saw of a well known type having an endless saw blade B passing around pulleys B', B² enclosed in suitable housings. The attachment consists of a carriage A which is adapted to move back and forth with respect to the moving saw blade, and having two turntables C and D rotatably mounted thereon which are preferably connected so that they are adapted to turn simultaneously through an angle of 90°, so that a block to be sawed can be placed thereon and sawed completely through in one direction, after which the turntable is turned through an angle of 90° and a new cut made at right angles to the first. A frame for supporting the table A having spaced parallel track members 10, 11 is carried on suitable supports 12, 13 which preferably extend to the floor upon which the band saw frame is carried. These track members may be rigidly held in spaced relation by means of transverse members 14 and 18.

The table A is made up of two spaced parallel plates 15, 16 which are rigidly secured together at the right-hand end by transverse members (not shown) while at the left-hand end they are secured together by a transverse bar 17, to which they are bolted preferably by means of wing nuts (not shown) so that this bar may be loosened and swung around, as shown in Fig. 3, to permit the band saw blade B to be passed therethrough when this blade is to be inserted or removed. Likewise a cross member 18 is used to secure the left-hand ends of the tracks 10, 11, and may be loosened and swung around, as indicated in Fig. 3, for the same purpose. The leg 13 is also made in sections (not shown) so as to be readily disassembled to permit the saw blade B to pass.

The table A carries four brackets 15ᵇ upon which are rotatably mounted rollers 15ᶜ which roll upon the tracks 10, 11. An adjustable stop 10ᵃ is provided at the right-hand end of the tracks to limit the movement of the table or carriage in this direction. The carriage is provided with two raised circular stands 19, 20 which are suitably supported on legs 21, 22. Concentric with these circular stands are circular tracks 23, 24, which are preferably intersecting, and which are adapted to receive flanged rollers 25. These rollers operate on the track 23 and are carried by the bottom of the turntable C, the top of which is of a height equal to or slightly above the circular stand 19. This turntable is preferably made up of three sections 26, 27, 28, which are separated by slots 29, 30, either of which can be turned so as to be in registration with the slot 19ᵃ in the circular stand 19, as well as with the longitudinal opening 15ᵃ between the table sections 15, 16 so as to permit the blade B to travel through the center of the table as it is moved.

The turntable D is likewise mounted on flanged rollers 31 which operate on the circular track 24 to turn the turntable D about the central circular stand 20, which is provided with a slot $20^a$ which goes only part way through, this stand being supported from the table A in the same manner as the turntable 19. The movement of the table to the left is limited by means of a guard 32 which is carried by the band saw frame, the guard extending up back of the band saw blade. Guards $20^b$ are adjustably secured to the stand 20 at each side of the saw blade by means of wing nuts $20^c$. These serve to keep the blocks away from the saw blade while the blocks are being moved on the turntable.

The turntable C is provided on two sides with vertical side boards to assist in positioning blocks to be sawed. These consist of plates 33, 34 secured to the turntable sections 26, 27, respectively, and extending above them at right angles. On the back of the plate 34 is mounted a rod or shaft 35 which extends beyond the left-hand end of the table to form a bearing for a channel or the like 36, to which is secured two other guide plates 37, 38, the latter being riveted to the channel 36 and carrying the turntable section 28. The parts carried by the channel 36 are secured in operating position by a wing nut 39 on the plate 37, as shown in Fig. 1.

Fig. 3 shows these members swung about the shaft 35 so as to enable the band saw blade B to be removed from the machine. At the same time an angle iron 40 is hingedly mounted to the underside of the section 27 and secured in the full line position of Fig. 3 by means of wing nuts (not shown). When released it can be swung back to the dotted line position. A handle 41 is secured to the channel member 36 to serve as a convenient means of moving the table or carriage back and forth on the track 10.

The turntables C and D are geared together so as to turn in the same direction at the same time. This is accomplished by means of flexible metal bands or the like 42, 43, which are secured to circular segments 44, 45, 46 and 47, which are secured beneath the turntables. The member 43 is secured to the circular segment 47 by means of a screw 48, or the like, so that it can be released to let the parts of the turntable C swing back, as shown in Fig. 3.

Thus it will be seen from the foregoing that when a block X to be sawed is placed on the turntable C and pushed back against the vertical stops, it is firmly positioned so that when the operator pushes the table or carriage A to the right, the band saw B being in operation, a cut X' will be made through the blocks and the band saw blade will proceed until it passes into the opening between the guide plates 37, 38. The stop $10^a$ fixes the point to which the table can proceed. The table is then drawn back, the guard 32 serving to clear the passage for the saw blade B.

Having drawn this table back to the point shown in Fig. 1, the operator then turns the turntable C to the left through the position of Fig. 4, into the position of Fig. 2. The ends of the plates of the turntables C and D are so formed as to permit them to pass as indicated. The block X is now turned at right angles to its previous position, and the table is again pushed forward feeding the blade B through the block forming the cut $X^2$ at right angles to the cut X'. A shelf E is provided at the back adjacent the turntables and slightly below them so that they may pass over part of the shelf in rotating from one position to the other, and the sawed blocks may now be shoved off on the shelf.

While I have shown and described but a single embodiment of my invention, it is to be understood that it is capable of many modifications. Changes, therefore, in the construction and arrangement may be made which do not depart from the spirit and scope of the invention as disclosed in the appended claims.

I claim:

1. In combination, a band saw having a vertically movable straight sawing portion, an attachment therefor comprising a runway in a plane substantially at right angles to said straight portion, a carriage adapted to move longitudinally on said runway, and means adapted to rotate with respect to the carriage and to hold a block to be sawed, said carriage and means having a slot therein through which the band saw operates as the carriage is advanced to saw through said block, and a bar situated back of said saw blade to act as a guard for it.

2. In combination, a band saw having a vertically movable straight sawing portion, an attachment therefor comprising a runway in a plane substantially at right angles to said straight portion, a carriage adapted to move longitudinally on said runway in a direction to pass the band saw through the block, and means adapted to rotate with respect to the carriage and to hold a block to be sawed, said carriage and means having a slot therein through which the band saw operates as the carriage is advanced to saw through said block, and a bar situated back of said saw blade to act as a guard for it.

3. In combination, a power band saw having a straight vertically moving saw blade portion, a carriage adapted to move back and forth, and having a platform mounted thereon adapted to carry a block to be sawed, said platform being provided with intersecting slots to permit the passage of the saw blade through the point of said intersection and being rotatable so as to present first one side and then another of the block to the saw so as to make intersecting cuts through the block along planes corresponding to said slots.

4. In combination, a power band saw having a straight vertically moving saw blade portion, a carriage adapted to move back and forth, and having a platform mounted thereon adapted to carry a block to be sawed, said platform comprising two spaced circular stands mounted in raised relation to the carriage and located longitudinally thereof, and platform sections rotatable one about each circular stand and substantially on a level therewith, said carriage and platform having slots adapted to register to permit the endwise movement of the saw blade through the platform and carriage in either of two positions of the platform to make intersecting cuts through the block.

5. In combination, a power band saw having a straight vertically moving saw blade portion, a carriage adapted to move back and forth and having a platform mounted thereon adapted to carry a block to be sawed, said platform comprising two spaced circular stands mounted in raised relation to the carriage and located longitudinally thereof, and platform sections operably connected together and rotatable one about each circular stand and substantially on a level therewith, said carriage and platform having slots adapted to register to permit the endwise movement of the saw blade through the platform and carriage in either of two positions of the platform to make intersecting cuts through the block.

6. In combination, a power band saw having a straight vertically moving saw blade portion, a carriage adapted to move back and forth and having a platform mounted thereon adapted to carry a block to be sawed, said platform comprising two spaced circular stands mounted in raised relation to the carriage and located longitudinally thereof, and platform sections operably connected together by flexible members passing around arcuate strips beneath the platforms and rotatable one about each circular stand and substantially on a level therewith, said carriage and platform having slots adapted to register to permit the endwise movement of the saw blade through the platform and carriage in either of two positions of the platform to make intersecting cuts through the block.

7. In combination, a power band saw having a straight vertically moving saw blade portion, a carriage adapted to move back and forth, and having a platform mounted thereon adapted to carry a block to be sawed, said platform comprising two spaced circular stands mounted in raised relation to the carriage and located longitudinally thereof, and platform sections of square outer contour and each subtending an angle of substantially 270° from the center of the stand, said platform sections being rotatable one about each circular stand and substantially on a level therewith, said carriage and platform having slots adapted to register to permit the endwise movement of the saw blade through the platform and carriage in either of two positions of the platform to make intersecting cuts through the block.

8. In combination, a power band saw having a straight vertically moving saw blade portion, a carriage adapted to move back and forth, and having a platform mounted thereon adapted to carry a block to be sawed, said platform comprising two spaced circular stands mounted in raised relation to the carriage and located longitudinally thereof, and platform sections of square outer contour and each subtending an angle of substantially 270° from the center of the stand, said platform sections being rotatable one about each circular stand and substantially on a level therewith, said carriage and platform having slots adapted to register to permit the endwise movement of the saw blade through the platform and carriage in either of two positions of the platform to make intersecting cuts through the block, one of said platform sections being removable to permit the endless band saw blade to be inserted or removed.

9. In combination, a power band saw having a straight vertically moving saw blade portion, a carriage adapted to move back and forth, and having a platform mounted thereon adapted to carry a block to be sawed, said platform comprising two spaced circular stands mounted in raised relation to the carriage and located longitudinally thereof, and platform sections rotatable one about each circular stand and substantially on a level therewith, said carriage and platform having slots adapted to register to permit the endwise movement of the saw blade through the platform and carriage in either of two positions of the platform to make intersecting cuts through the block, the parts of said carriage and platform being formed so as to be removable thereby permitting the endless band saw blade to be removed or inserted.

10. In combination, a power band saw having a straight vertically moving saw blade portion, a carriage adapted to move back and forth and having a platform mounted thereon adapted to carry a block to be sawed, said platform comprising two spaced circular stands mounted in raised relation to the carriage and located longitudinally thereof, platform sections rotatable one about each circular stand and substantially on a level therewith, said carriage and platform having slots adapted to register to permit the endwise movement of the saw blade through the platform and carriage in either of two positions of the platform to make intersecting cuts through the block, and a shelf adjacent the platform and slightly below it so that the platform in turning passes over part of the shelf which is adapted to receive the sawed blocks.

FRED G. WALKER.